United States Patent [19]
Hoge et al.

[11] Patent Number: 5,303,875
[45] Date of Patent: Apr. 19, 1994

[54] LEADER BLOCK FOR MAGNETIC TAPE CARTRIDGE

[76] Inventors: David T. Hoge, Arvada, Colo.; Michael W. Johnson, Cottage Grove, Minn.; John C. Owens, Arvada, Colo.; George P. Rambosek, Shafer, Minn.

[73] Assignee: Minnesota Mining and Manufacturing Company, St. Paul, Minn.; Storage Technology Corporation, Louisville, Colo.

[21] Appl. No.: 833,350

[22] Filed: Feb. 10, 1992

[51] Int. Cl.⁵ .......................... G03B 1/04; G11B 15/32
[52] U.S. Cl. .......................................................... 242/197
[58] Field of Search .................................. 242/197, 195

[56] References Cited
U.S. PATENT DOCUMENTS

| | | | |
|---|---|---|---|
| 3,188,091 | 6/1965 | Goodell | 242/195 |
| 3,620,475 | 11/1971 | Penn | 242/197 |
| 3,744,736 | 7/1973 | Kruhn | 242/195 |
| 3,840,196 | 10/1974 | Presentey | 242/74 |
| 4,350,309 | 9/1982 | Richard et al. | 242/68.5 X |
| 4,383,660 | 5/1983 | Richard et al. | 242/197 |
| 4,577,811 | 3/1986 | Bray et al. | 242/195 |

*Primary Examiner*—Daniel M. Yasich
*Attorney, Agent, or Firm*—Duft, Graziano & Forest

[57] ABSTRACT

The improved leader block uses a substantially rectangular body that is equipped with two tape guide projections which form, in conjunction with the front of the body, a U-shaped channel open at one end and adapted to received the end of the magnetic tape that extends through the opening in the housing of the magnetic tape cartridge. The size and shape of this U-shaped channel substantially corresponds to the dimensions of the magnetic tape in order to precisely align the magnetic tape within the channel and with reference to the leader block body. The section of the front of the leader block body that constitutes the bottom of the U-shaped channel includes a plurality of parallel oriented, spaced apart grooves inscribed therein. These grooves extend from the top tape guide projection to the bottom tape guide projection in order to provide slots to receive corresponding projections that are included on the surface of the cover of the leader block. The cover fits into the U-shaped channel once the magnetic tape has been placed therein to sandwich the magnetic tape between the cover and the body of the leader block. The projections on the cover force the magnetic tape into the corresponding grooves in the face of the leader block body in order to thereby prevent the movement of the end of the magnetic tape with reference to the body of the leader block.

48 Claims, 3 Drawing Sheets

LEADER BLOCK FOR MAGNETIC TAPE CARTRIDGE

FIELD OF THE INVENTION

This invention relates to magnetic tape cartridges and, in particular, to an improved leader block that is attached to one end of the magnetic tape contained in the magnetic tape cartridge and which is used to extract the tape from the cartridge.

PROBLEM

It is a problem in the field of 3480-type magnetic tape cartridges to provide a leader block that securely and precisely fastens to one end of the magnetic tape contained in the magnetic tape cartridge while also being simple to install on the magnetic tape without the use of complicated tools. A misalignment of the magnetic tape to the leader block can result in the cartridge and the leader block becoming jammed in the tape drive. Existing leader blocks in use on 3480-type magnetic tape cartridges require the use of special installation tools to attain the required alignment between the magnetic tape and the leader block which makes field installation of leader blocks on the 3480-type magnetic tape cartridges a difficult task.

These existing leader blocks are oriented such that the magnetic tape exits the leader block from the side. The side exit of the tape from the leader block places a strain on the magnetic tape and can interfere with the fit between the leader block and the takeup reel. When the leader block is fully inserted into the takeup reel, the leader block forms a part of the outer circumference of the takeup reel and thus the magnetic tape winding surface. Any misalignment of the magnetic tape to the leader block or a failure to properly seat the leader block in the takeup reel results in a non-uniform tape winding surface which causes undesirable impressions in the magnetic tape as it is wrapped on the takeup reel. Finally, special leader block docking mechanisms must be employed in order to smoothly seat the leader block in the magnetic tape cartridge.

While this existing leader block apparatus is fairly reliable in its operation, the above noted limitations represent detrimental design limitations contained therein.

SOLUTION

The above described problems are solved and a technical advance achieved in the field by the improved leader block for magnetic tape cartridges of the present invention. This leader block is simple to install without the use of complex installation tools to thereby enable field personnel to affix a leader block to a magnetic tape cartridge. This leader block also orients the magnetic tape to exit the leader block through one end thereof in order to minimize the strain on the magnetic tape and to avoid undesirable impressions on the magnetic tape as it is wrapped on the takeup reel.

This is accomplished by the use of a substantially rectangular body that is preferably equipped with two tape guide projections which form, in conjunction with the front of the body, a U-shaped channel open at one end and adapted to receive the end of the magnetic tape that extends through the opening in the housing of the magnetic tape cartridge. The size and shape of this U-shaped channel substantially corresponds to the dimensions of the magnetic tape in order to precisely align the magnetic tape within the channel and with reference to the leader block body. The section of the front of the leader block body that constitutes the bottom of the U-shaped channel preferably includes either one or a plurality of parallel oriented, spaced apart grooves inscribed therein. These grooves extend from the top tape guide projection to the bottom tape guide projection and receive corresponding projections on the surface of the cover of the leader block. The cover preferably fits into the U-shaped channel once the magnetic tape has been placed therein to sandwich the magnetic tape between the cover and the body of the leader block. The projections on the cover force the magnetic tape into the corresponding grooves in the face of the leader block body in order to thereby prevent the movement of the end of the magnetic tape with reference to the body of the leader block. The magnetic tape exits the centerline of the leader block to enable the tape threading arm to pull the leader block in a straight line with the magnetic tape rather than at an angle as with existing side exit leader blocks. The centerline tape exit also allows the leader block to clear a narrow tape threading path in the tape drive.

A preferred embodiment of the leader block uses a pin and socket arrangement to pivotally interconnect one end of the cover to the body of the leader block in a position to enable the cover to close into the U-shaped channel. The cover in the preferred embodiment is snap fit into this channel by means of at least one notch placed on the top and bottom tape guide projections. These notches mate with corresponding tabs on the cover in order to enable the cover to snap fit securely to the body of the leader block.

The end of the leader block body opposite the open end of the channel includes a socket adapted to receive the tape threading arm leader block pin in order to enable the tape threading arm to grasp the leader block securely and extract the magnetic tape from the magnetic tape cartridge. A notch is also optionally provided on the back of the leader block body to engage a leader block latch mechanism contained in the magnetic tape cartridge. Finally, a pair of docking pins are preferably included on the top and bottom of the body of the leader block, juxtaposed to the magnetic tape threading end, in order to guide the leader block into the opening in the magnetic tape cartridge when the magnetic tape is rewound on the magnetic tape cartridge reel. The docking pins also guide the leader block into the takeup reel during the magnetic tape threading operation. This architecture provides a leader block that can be assembled without the use of fasteners or special tools in a field environment. This leader block simply aligns and reliably secures the magnetic tape in the leader block.

DETAILED DESCRIPTION

One type of computer system tape transport presently in use makes use of the IBM 3480-type magnetic tape cartridge as the data storage media. The 3480-type magnetic tape cartridge consists of a substantially rectangular exterior housing that contains a single reel of magnetic tape with a leader block affixed to one end of the magnetic tape. The leader block is exposed through an opening in the exterior housing of the magnetic tape cartridge for use by an associated tape drive to retrieve the magnetic tape from the magnetic tape cartridge. A tape threading arm in the tape drive grasps the leader block to extract the magnetic tape through the opening in the one corner of the magnetic tape cartridge and transport the leader block along a tape threading path to be inserted into the takeup reel of the tape drive.

The external dimensions and architecture of the 3480-type magnetic tape cartridge are an industry standard, as is the tape threading arm leader block pin that is used to grasp the leader block. The leader block illustrated in FIGS. 1 and 2 interfaces to equivalent elements and details of the magnetic tape cartridge and tape threading arm leader block pin are omitted for the sake of brevity.

Leader Block Body

Figure 1:
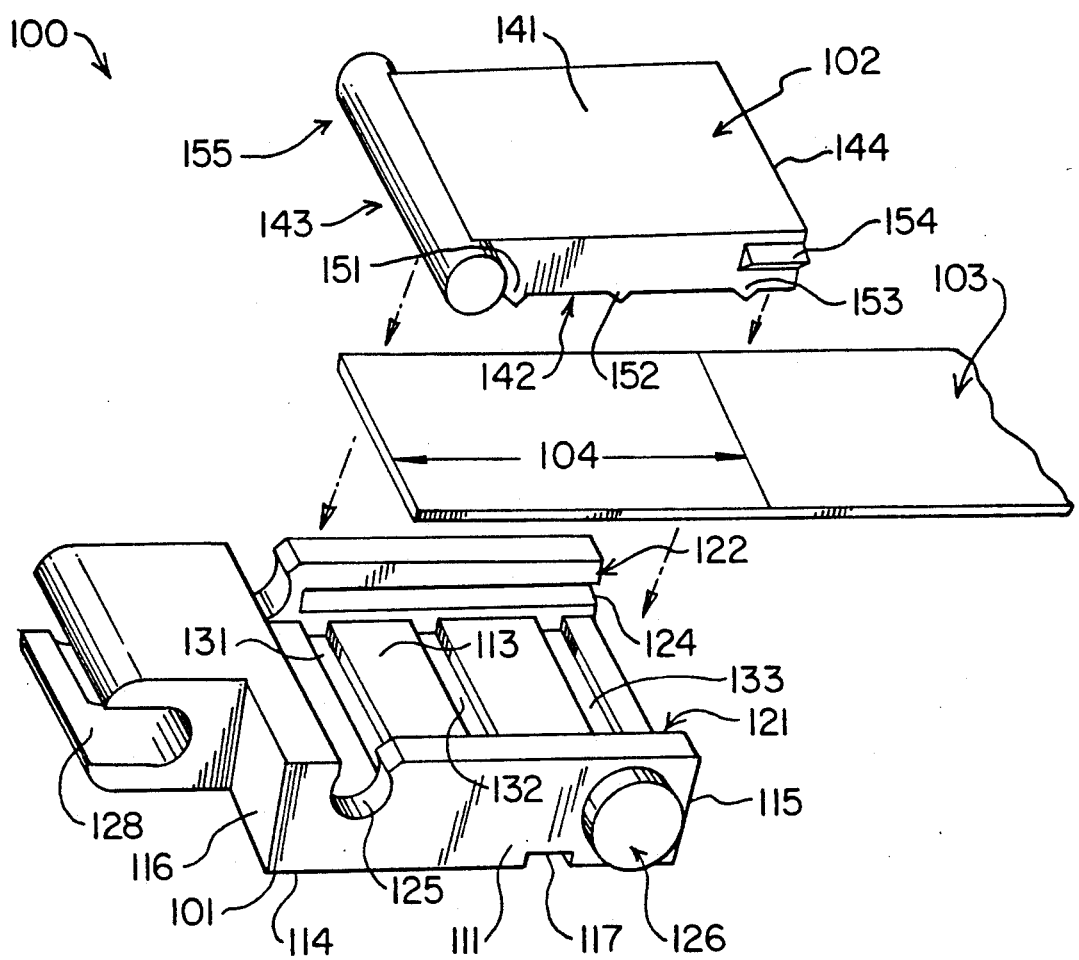
FIG. 1 illustrates an exploded perspective view of the leader block of the present invention.
Figure 2:
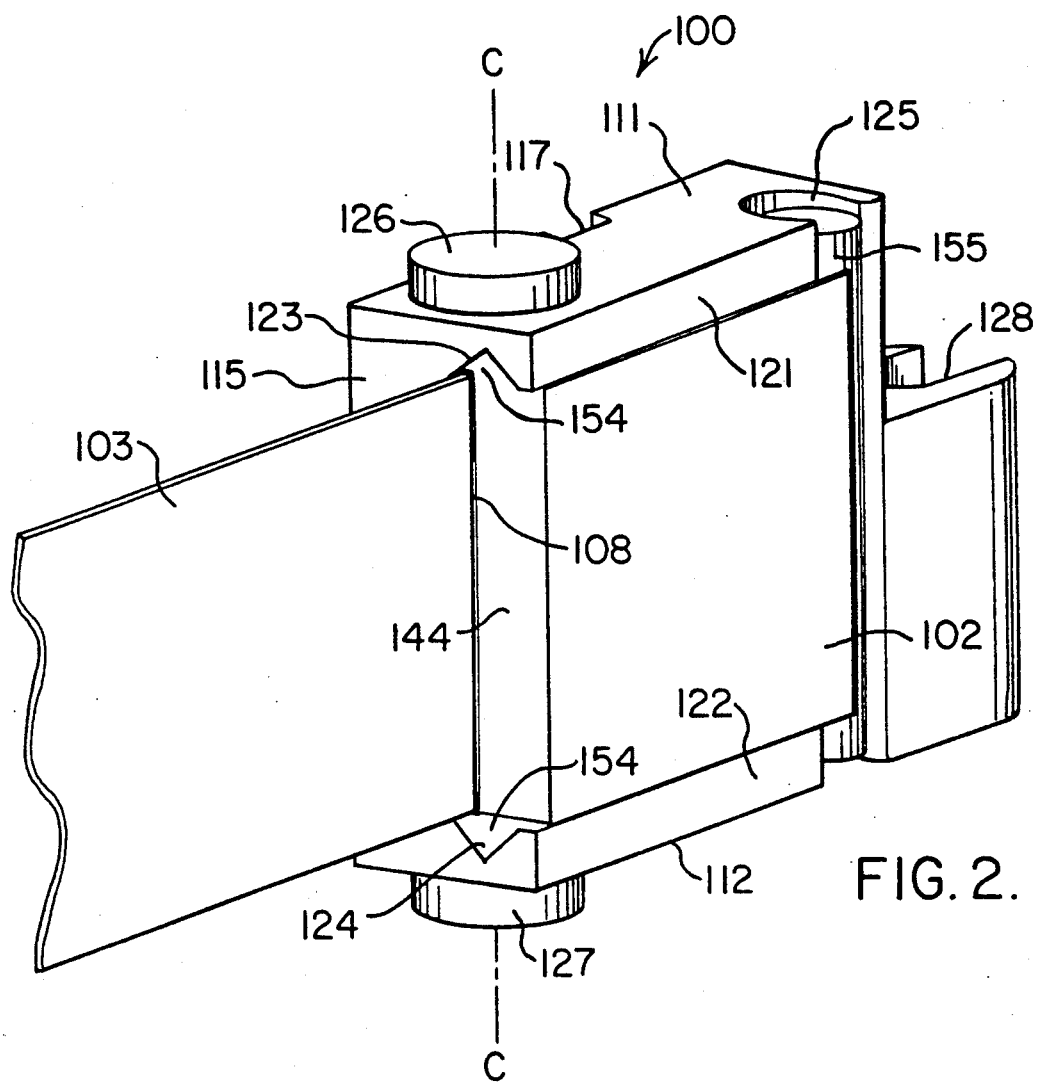
FIG. 2 illustrates an end perspective view of the assembled leader block.

FIG. 1 illustrates an exploded perspective view of the leader block 100 of the present invention and FIG. 2 illustrates an end perspective view of leader block 100 in its assembled form. Leader block 100 consists of a body 101 and a cover 102 which function, when interconnected as illustrated in FIG. 2, to sandwich magnetic tape 103 therebetween in order to securely and precisely fasten leader block 100 to magnetic tape 103. It is critical to the reliable operation of the magnetic tape cartridge 300 (FIG. 3) to have leader block 100 precisely oriented with respect to magnetic tape 103 and securely fastened thereto. Therefore, leader block 100 must be self aligning with reference to magnetic tape 103 as well as securely fastened thereto. This is accomplished without the use of fasteners or the need for a special assembly mechanism by means of the simple snap fit, self aligning design of leader block 100.

Magnetic tape 103 has a first end 104 which extends through the opening 301 in the magnetic tape cartridge 300 to enable the associated tape drive to extract magnetic tape 103 from the magnetic tape cartridge 300 by means of leader block 100 which is attached to magnetic tape 103 at first end 104. Leader block 100 includes body 101 that has a top 111, a bottom 112, a front 113, a back 114, a first side 115 and a second side 116. The top 111 and bottom 112 of body 101 include a first tape guide projection 121 and a second tape guide projection 122, respectively, which are extensions of top 111 and bottom 112 that protrude over the front 113 of body 101. First tape guide projection 121, front 113 and second tape guide projection 122 in combination form a substantially U-shaped channel open at one end and adapted to receive the first end 104 of magnetic tape 103. The dimensions of the first tape guide projection 121 and the second tape guide projection 122 are such that the U-shaped channel formed therebetween substantially matches the physical dimensions of the first end 104 of magnetic tape 103. Magnetic tape 103 exits first side 115 of leader block 100 substantially at the centerline C—C of first side 115. This allows the tape threading arm to pull leader block 100 in a straight line with magnetic tape 103. The straight line pull of leader block 100 also provides a narrow cross section profile to the tape threading path and permits the use of a narrower tape threading path than presently used.

Leader Block Assembly

In the assembly of leader block 100, a craftsperson places first end 104 of magnetic tape 103 in the bottom of U-shaped channel (described above) coplanar with and juxtaposed to front 113 of body 101. The U-shaped channel precisely aligns body 101 with the long dimension of magnetic tape 103 such that the top and bottom edges of magnetic tape 103 are parallel to top 111 and bottom 112 of leader block 100. A plurality of parallel oriented spaced apart grooves 131–133 are inscribed in the front 113 of body 101 in the bottom of the U-shaped channel. These grooves 131–133 illustrated in FIG. 1 are shown as rectangular shaped channels although their number (at least one), precise geometry and dimensions are a matter of engineering choice and alternatively can be V-shaped grooves or semi-cylindrical troughs. These plurality of grooves 131–133 extend substantially along the full width of the U-shaped channel from first tape guide projection 121 to second tape guide projection 122. Cover 102 of leader block 100 includes a like plurality of parallel oriented spaced apart projections 151–153 that mate with grooves 131–133. Thus, when cover 102 and body 101 are interconnected as illustrated in FIG. 2, the projections 151–153 force sections of magnetic tape 103 into the corresponding grooves 131–133 to form a lock mechanism to securely fix first end 104 of magnetic tape 103 within leader block 100. The use of the rectangular shaped grooves 131 133 and triangular projections 151–153 cause magnetic tape 103 to be rigidly connected to leader block 100.

Leader Block Cover

The interconnection of cover 102 and body 101 in the preferred embodiment is accomplished by means of both tab and notch as well as pin and socket mechanisms. These two mechanisms are illustrative of a simple way to snap fit body 101 and cover 102 together, although there are other mechanical interconnections that are alternatives to those illustrated herein. Cover 102 includes a pin 155 located at a first end 143 thereof, which pin 155 is insertable into socket 125 located proximate to the second side 116 of body 101. The pin 155 of cover 102 is snapped into socket 125 thereby enabling cover 102 to hingeably pivot about the pin and socket joint to simplify the mechanical interconnection of cover 102 and body 101. Once cover 102 is hingeably connected to body 101, the opening between front 113 of body 101 and back 142 of cover 102 at the first side 115 of body 101 constitutes an aperture located at the centerline of leader block 100 and adapted to receive first end 104 of magnetic tape 103. The size of this aperture is a function of the position of cover 102 and the second end 144 of cover 102 can be closed to come into contact with body 101 such that back surface 142 of cover 102 sandwiches first end 104 of magnetic tape 103 to front 113 of body 101. The locking of cover 102 to body 101 is completed by the use of tabs 154, 156 located on the top and bottom of cover 102, which tabs interconnect with notches 123 and 124 located on first tape guide projection 121 and second tape guide projection 122, respectively. As illustrated in FIG. 1, tabs 154, 156 are triangular shaped elements while notches 123 and 124 are V-shaped grooves adapted to receive tabs 154, 156. The exact geometry of tabs 154, 156 and notches 123, 124 are illustrative and not intended to limit the applicability of the concept illustrated herein.

The notches 123, 124 extend lengthwise along a section of first tape guide projection 121 and second tape guide projection 122, and the exact length of tabs 154, 156 on cover 102 is a matter of design choice and must be sufficient to securely interlock cover 102 with body 101.

Additional Leader Block Features

Leader block 100 also includes a tape threading arm socket 128 located at the second side 116 thereof, which tape threading arm socket 128 is adapted to receive a tape threading arm pin. The tape threading arm socket 128 comprises a substantially semi-cylindrical socket extending from the top 111 of body 101 a significant portion of the way towards bottom 112 of body 101.

Figure 3:
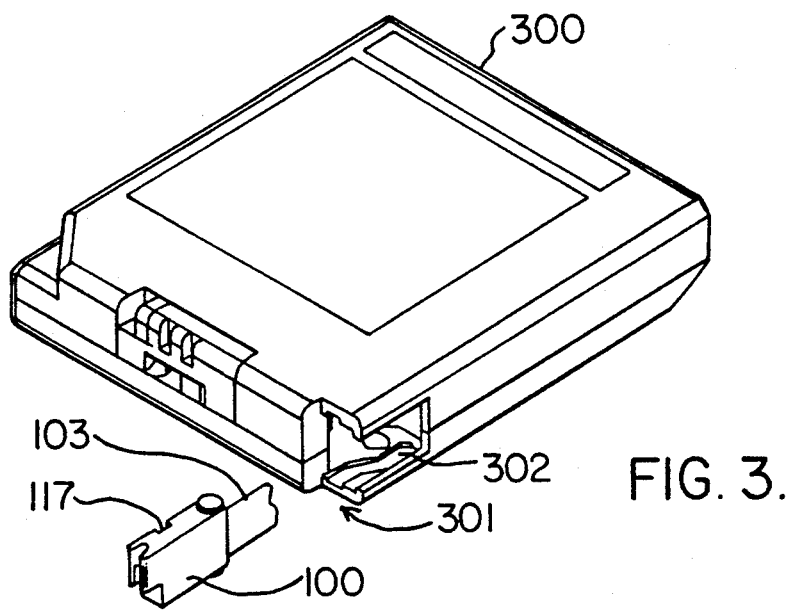
FIG. 3 illustrates a perspective view of the magnetic tape cartridge.

Also included in leader block 100 is a pair of substantially cylindrical docking pins 126, 127 which function to align leader block 100 with the opening 301 in the magnetic tape cartridge 300 (FIG. 3). Docking pins 126, 127 are located on the top 111 and bottom 112 of body 101 and located proximate to the first side 115 thereof. As the magnetic tape 103 is withdrawn into the magnetic tape cartridge 300, the first side 115 of leader block 100 reaches the opening 301 in the magnetic tape cartridge 300, causing docking pins 126, 127 encounter the edges of guide slots 302 to guide the first side 115 of leader block 100 into this opening 301 in order to enable leader block 100 to seat in the opening 301 in the magnetic tape cartridge 300. Guide slots 302 are typically located on the inside surfaces of both the top and bottom sides of magnetic tape cartridge 300. Guide slots 302 are of a shape and extent to precisely define a leader block docking path into opening 301. The use of guide slots 302 enable the leader block 100 to be precisely positioned in opening 301 by the tape rewind operation. A similar set of guide slots may be optionally provided in the takeup reel to perform a similar leader block guide function and to precisely regulate the positioning of first end 115 of leader block 100 with respect to the tape winding surface of the takeup reel.

Second end 144 of cover 102 is recessed approximately the thickness of magnetic tape 103 from first side 115 of body 101. When the leader block 100 is inserted into the takeup reel of the tape drive, the first side 115 (which may be curved in shape) of leader block 100 forms a part of the outer circumference of the takeup reel and thus first side 115 is part of the magnetic tape winding surface. Docking pins 126, 127 precisely determine the location of first side 115 in the takeup reel by mating with corresponding notches in the takeup reel. The magnetic tape 103 is wrapped first over second end 144 of cover 102 and thence around the takeup reel. When one complete wrap of tape is taken, first side 115 and second end 144 of cover 102 (with one thickness of magnetic tape 103 wrapped over second end 144) form a smooth surface to prevent subsequent wraps of magnetic tape 103 on the takeup reel from having impressions thereon caused by the leader block protruding from the takeup reel.

Leader Block Latch Mechanism

Figure 5:
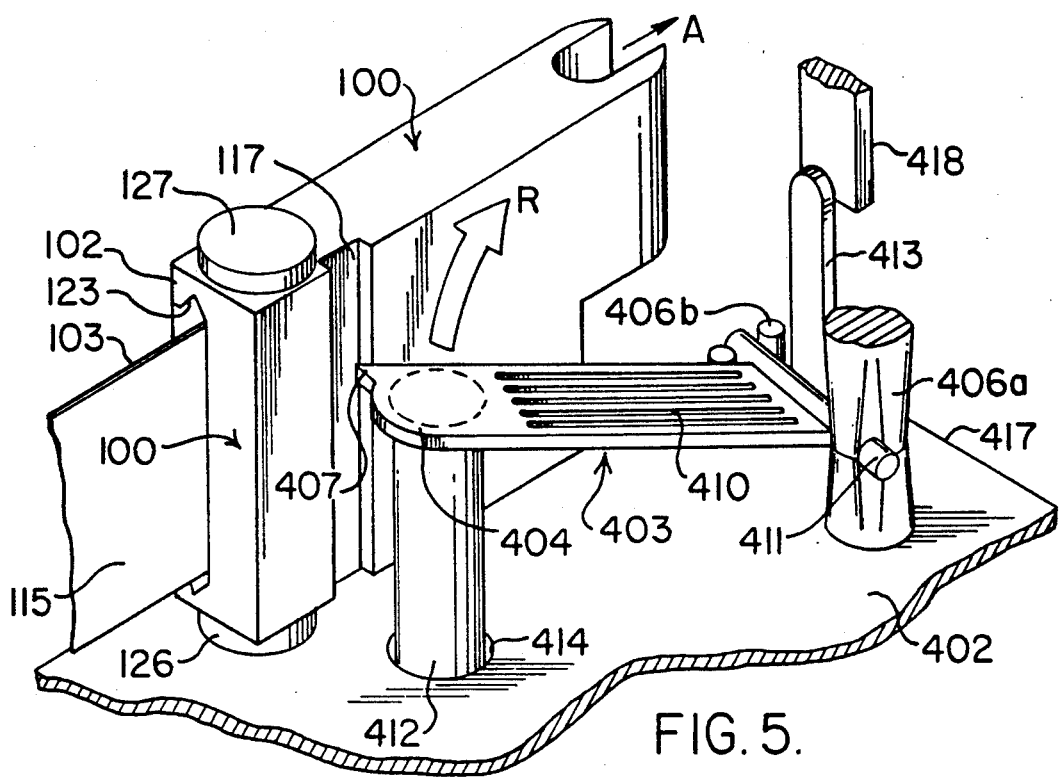
FIGS. 4 and 5 illustrate a leader block latch mechanism container in the magnetic tape cartridge.
Figure 4:
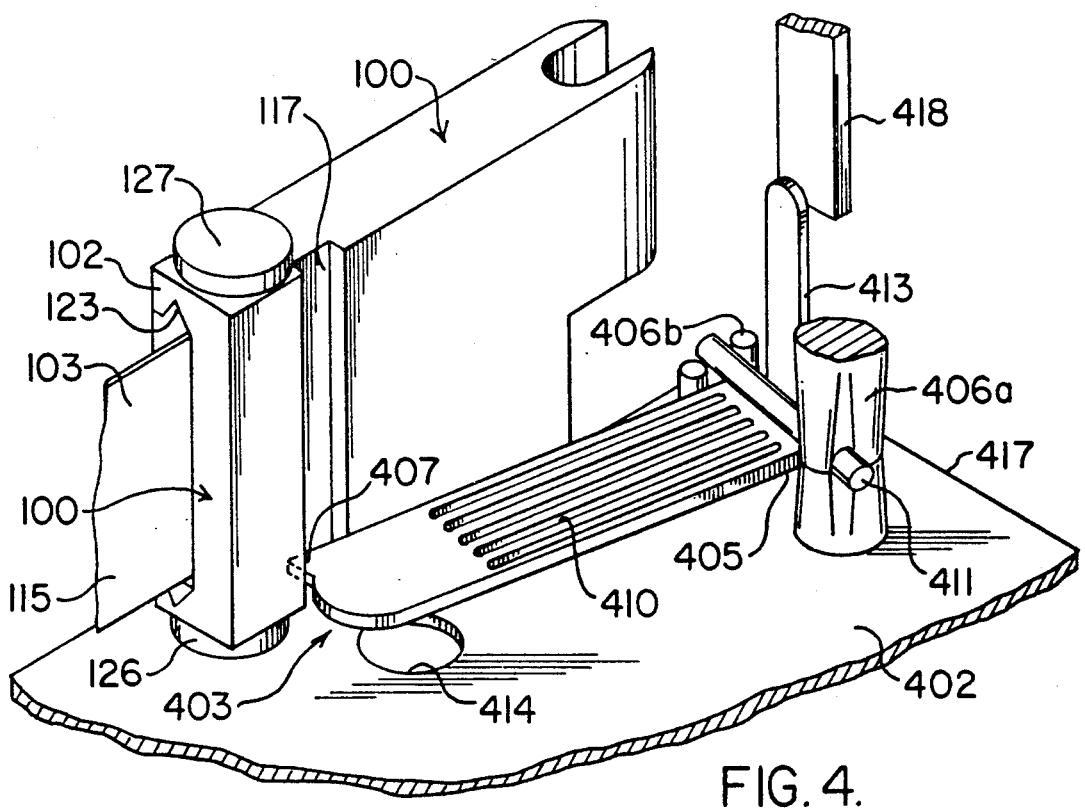

A groove 117 is provided in back 114 of leader block 100 to accept a leader block latch mechanism. Groove 117 can be a rectangular, semi-cylindrical or V-shaped notch extending from top 111 to bottom 112 of back 114 of body 101. FIGS. 4 and 5 illustrate a preferred leader block latch mechanism that can be incorporated in magnetic tape cartridge 300 to lock leader block 100 into magnetic tape cartridge 300. The leader block latch mechanism 402 consists of a latch arm 403 that is pivotally connected at one end 405 to the housing 417 of the magnetic tape cartridge 300 by an appropriate pivot mechanism 406a, 406b, 411 includes a socket The pivot mechanism 406a, 406b, 411 includes a socket consisting of pivot pin cradle 106b and a support 406a to securely affix this mechanism to the magnetic tape cartridge housing 417 as well as precisely position it therein. A pivot pin 411 is included in the one end 405 of latch arm 403 and rests in the socket with one end being placed in pivot pin cradle 406b and a second end placed into an opening in support 406a. This pivot arrangement enables latch arm 403 to rotate in direction R as shown in FIG. 5.

Attached to latch arm 403 is a spring 413 that interconnects the latch arm 403 of the latch mechanism 402 to a stop 418 attached to the housing 417. Spring 413 is shown as a flexible member attached to latch arm 403 in a "living hinge" configuration to place the latch arm 402 in a first position (FIG. 4) as a result of the application of a force to the latch arm 403 by the spring 413. This first position is the leader block locked position illustrated in FIG. 4. In this position, the latch arm 403 is located to prevent the withdrawal of the leader block 100 from the magnetic tape cartridge housing 417. This is accomplished by the use of a projection 407 at the end of the latch arm 403 that engages a corresponding feature 117 on the leader block 100. If the user or a tape drive were to attempt to withdraw the leader block 100 from the magnetic tape cartridge 300, the forward motion (direction A) of the leader block 100 would be arrested by the latch arm 403 encountering the leader block notch groove, thereby preventing any motion of the leader block 100 in direction A. Therefore, the leader block 100 is captured between the latch arm 103 and the docking stop wherein the leader block groove 117 prevents the leader block 100 from moving in either of its normal operational directions (+A, −A). Spring 413 maintains latch arm 403 in this locked position absent the application of any exterior force in order to always provide a leader block lock function to safeguard the integrity of the magnetic tape 103 contained within the magnetic tape cartridge 300.

Release of Leader Block Latch Mechanism

The latch mechanism 402 is shifted to its second position, illustrated in FIG. 5, by the application of an external force to latch arm 403 to overcome the force applied thereon by the spring 413. This force is generally applied thereon by the spring 413. This force is generally applied to latch arm 403 through the insertion of a leader block latch release pin 412 through an aperture 414 in the bottom of the magnetic tape cartridge housing 417 to rotate the latch arm 403 in a vertical direction (R) about pivot pin 411, such that the end 404 of the latch arm 403 clears the leader block groove 117 on the leader block 100 to enable a user or a tape drive to extract the leader block 100 from within the magnetic tape cartridge housing 417.

This latch release pin 412 is typically part of the tape drive mechanism and is positioned adjacent to the drive hub on which the magnetic tape cartridge 300 is placed by the tape drive mechanism. Therefore, as the magnetic tape cartridge 300 is loaded onto the drive hub by the user or by an appropriate elevator mechanism contained within the tape drive, as is well known in the art, the latch release pin 412 contained in this tape drive mechanism enters aperture 414 in the bottom of the magnetic tape cartridge housing 417 and encounters latch arm 403 which is locking the leader block 100 in its locked position. As the magnetic tape cartridge 300 is lowered further on the drive hub, this latch release pin 412 forces the latch arm 403 to rotate about pivot pin 411 in a vertical direction a sufficient distance to enable the projection 407 on the end 404 of the latch arm 403 to clear the leader block groove 117 contained on the leader block 100 thereby freeing the leader block 100 to be withdrawn from the magnetic tape cartridge housing 417.

SUMMARY

As can be seen from the assembled structure of FIG. 2, magnetic tape 103 exits leader block 100 via first side 115 at a point substantially in the middle (centerline) of first side 115. Leader block 100 exerts a linear force on magnetic tape 103 in a direction that is coplanar with the surface of magnetic tape 103 thereby avoiding any tangential or acute angle components of this force which have a tendency to cause magnetic tape 103 to tear. The simple snap fit architecture of leader block 100 enables a craftsperson to quickly assembly leader block 100 and interconnect it to the magnetic tape 103 without the use of fasteners or special tools while precisely aligning magnetic tape 103 with leader block 100.

While a specific embodiment of this invention has been disclosed, it is expected that those skilled in the art can and will design alternate embodiments, of this invention that fall within the scope of the appended claims.

We claim:

1. A leader block for a magnetic tape having a first end, comprising:
   a substantially rectangular body means having top, bottom, front, back, first and second sides thereto, wherein said top and bottom include first and second tape guide projections, respectively, extending outward from said front, coplanar with said top and bottom sides, respectively, to form with said front a substantially U-shaped channel, open at one end to said first side, to receive said first end of said magnetic tape and align said first end of said magnetic tape coplanar with said front and juxtaposed thereto; and
   cover means latchably insertable into said substantially U-shaped channel of said body means to sandwich said first end of said magnetic tape between said cover means and said front of said body means to secure said first end of said magnetic tape in said U-shaped channel of said body means.

2. The leader block of claim 1 wherein said first and second tape guide projections each include at least one notch for mating with corresponding tabs on said cover means to fasten said cover means and said body means together.

3. The leader block of claim 2 wherein said cover means and said body means snap fit together via said notches and corresponding tabs.

4. The leader block of claim 2 wherein said notches are substantially V-shaped grooves and said tabs are substantially V-shaped projections.

5. The leader block of claim 1 wherein said cover means includes a pin located at a first end of said cover means, which said first end is proximate said second side of said body means for mating with a corresponding socket located on said front of said body means, proximate said second side of said body means.

6. The leader block of claim 1 wherein said front of said body means includes at least one groove inscribed in said front, extending substantially from said first tape guide projection to said second tape guide projection and adapted to receive a mating projection, located on a surface of said cover means facing said front of said body means, to insert said first end of said magnetic tape into said groove when said cover means is fastened to said body means.

7. The leader block of claim 6 wherein said at least one groove is substantially rectangular in cross section and said mating projection is substantially V-shaped.

8. The leader block of claim 1 wherein said front of said body means includes a plurality of parallel spaced apart grooves inscribed in said front, extending substantially from said first tape guide projection to said second tape guide projection and adapted to receive a mating like plurality of parallel spaced apart projections, located on a surface of said cover means facing said front of said body means, to insert said first end of said magnetic tape into said plurality of grooves when said cover means is fastened to said body means.

9. The leader block of claim 8 wherein said plurality of parallel spaced apart grooves are each substantially rectangular in cross section and said mating projections are substantially V-shaped.

10. The leader block of claim 1 wherein said second end of said body means includes a substantially semi-cylindrical notch adapted to receive a tape threading mechanism leader block threading pin.

11. The leader block of claim 1 further including first and second docking pin means located on said top and bottom, respectively, of said body means, proximate said first side and adapted to guide said leader block into an opening in a magnetic tape cartridge that houses said magnetic tape.

12. The leader block of claim 11, wherein said magnetic tape in enclosed within a magnetic tape cartridge having a leader block latch mechanism including a latch member to prevent the withdrawal of said leader block from said magnetic tape cartridge, said docking pin means being located on said leader block to engage said latch member.

13. The leader block of claim 11 wherein said first and second docking pin means are substantially cylindrical in shape.

14. The leader block of claim 1, wherein said magnetic tape in enclosed within a magnetic tape cartridge having a leader block latch mechanism including a latch member to prevent the withdrawal of said leader block from said magnetic tape cartridge, said leader block further comprising:
   means adapted to receive said latch member when said leader block is withdrawn into said magnetic tape cartridge.

15. The leader block of claim 14 wherein said receiving means comprises a groove on said leader block adapted to engage a corresponding mating feature on said latch member.

16. The leader block of claim 13 wherein said receiving means comprises a notch extending substantially across said back of said leader block from said top to said bottom of said leader block and of a geometry to receive a mating projection on said latch member.

17. A leader block for a magnetic tape having a first end, comprising:

a substantially rectangular body means having top, bottom, front, back, first and second sides thereto, wherein said top and bottom include first and second tape guide projections, respectively, extending outward from said front, coplanar with said top and bottom, respectively to form with said front a substantially U-shaped channel, open at one end to said first side, to receive said first end of said magnetic tape and align said first end of said magnetic tape coplanar with said front and juxtaposed thereto; and cover means insertable into said substantially U-shaped channel of said body means wherein said front of said body means includes at least one groove inscribed in said front, extending substantially from said first tape guide projection to said second tape guide projection and adapted to receive a mating projection, located on a surface of said cover means facing said front of said body means, to insert said first end of said magnetic tape into said groove when said cover means is fastened to said body means to sandwich said first end of said magnetic tape between said cover means and said front side of said body means in a manner to prevent movement of said first end of said magnetic tape with reference to said body means, wherein said first and second tape guide projections each include at least one notch for mating with corresponding tabs on said cover means to fasten said cover means and said body means together.

18. The leader block of claim 17 wherein said cover means and said body means snap fit together via said notches and corresponding tabs.

19. The leader block of claim 17 wherein said notches are substantially V-shaped grooves and said tabs are substantially V-shaped projections.

20. The leader block of claim 17 wherein said cover means includes a pin located at a first end of said cover means, which said first end is proximate said second side of said body means for mating with a corresponding socket located on said front of said body means, proximate said second side of said body means.

21. The leader block of claim 17 wherein said second end of said body means includes a substantially semi-cylindrical notch adapted to receive a tape threading mechanism leader block threading pin.

22. The leader block of claim 17 further including first and second substantially cylindrical docking pin means located on said top and bottom, respectively of said body means, proximate said first side and adapted to guide said leader block into an opening in a magnetic tape cartridge that houses said magnetic tape.

23. The leader block of claim 22, wherein said magnetic tape in enclosed within a magnetic tape cartridge having a leader block latch mechanism including a latch member to prevent the withdrawal of said leader block from said magnetic tape cartridge, said docking pin means being located on said leader block to engage said latch member.

24. The leader block of claim 17 wherein said at least one groove is substantially rectangular in cross section and said mating projection is substantially V-shaped.

25. The leader block of claim 17, wherein said magnetic tape in enclosed within a magnetic tape cartridge having a leader block latch mechanism including a latch member to prevent the withdrawal of said leader block from said magnetic tape cartridge, said leader block further comprising:

means adapted to receive said latch member when said leader block is withdrawn into said magnetic tape cartridge.

26. The leader block of claim 25 wherein said receiving means comprises a groove on said back of said leader block adapted to engage a corresponding mating feature on said latch member.

27. The leader block of claim 24 wherein said receiving means comprises a notch extending substantially across said back of said leader block from said top to said bottom of said leader block and of a geometry to receive a mating projection on said latch member.

28. A leader block for a magnetic tape having a first end, comprising:

a substantially rectangular body means having a substantially U-shaped channel, open at one end thereof to receive said first end of said magnetic tape and align said first end of said magnetic tape coplanar with the bottom of said substantially U-shaped channel and juxtaposed thereto, wherein a second end of said body means, distal from said first end, includes a substantially semi-cylindrical notch adapted to receive a tape threading mechanism leader block threading pin; and cover means latchably insertable into said substantially U-shaped channel of said body means to sandwich said first end of said magnetic tape between said cover means and said bottom of said substantially U-shape channel to secure said first end of said magnetic tape in said U-shaped channel of said body means.

29. The leader block of claim 28 wherein the walls of said substantially U-shaped channel each include at least one notch for mating with corresponding tabs on said cover means to fasten said cover means and said body means together.

30. The leader block of claim 29 wherein said cover means and said body means snap fit together via said notches and corresponding tabs.

31. The leader block of claim 29 wherein said notches are substantially V-shaped grooves and said tabs are substantially V-shaped projections.

32. The leader block of claim 28 wherein said cover means includes a pin located at a first end of said cover means, which for hingeably mating with a corresponding socket located on said body means.

33. The leader block of claim 28 wherein said bottom of said substantially U-shaped channel includes at least one groove inscribed therein, extending substantially from side to side along said bottom and adapted to receive a mating projection located on a surface of said cover means facing said bottom of said substantially U-shape channel to insert said first end of said magnetic tape into said groove when said cover means is fastened to said body means.

34. The leader block of claim 33 wherein said at least one groove is substantially rectangular in cross section and said mating projection is substantially V-section shaped.

35. The leader block of claim 28 wherein said bottom of said substantially U-shaped channel includes a plurality of parallel spaced apart grooves inscribed therein, extending substantially from side to side along said bottom and adapted to receive a mating like plurality of parallel spaced apart projections located on a surface of said cover means facing said bottom of said substantially U-shape channel to insert said first end of said magnetic tape into said groove when said cover means is fastened to said body means.

36. The leader block of claim 35 wherein said plurality of parallel spaced apart grooves are each substantially rectangular in cross section and said mating projections are substantially V-shaped.

37. The leader block of claim 28 further including first and second docking pin means located on top and bottom sides, respectively of said body means and adapted to mate with corresponding docking notches on a magnetic tape cartridge that houses said magnetic tape.

38. The leader block of claim 37 wherein said first and second docking pin means are substantially cylindrical in shape.

39. The leader block of claim 37, wherein said magnetic tape in enclosed within a magnetic tape cartridge having a leader block latch mechanism including a latch member to prevent the withdrawal of said leader block from said magnetic tape cartridge, said docking pin means being located on said leader block to engage said latch member.

40. The leader block of claim 28, wherein said magnetic tape in enclosed within a magnetic tape cartridge having a leader block latch mechanism including a latch member to prevent the withdrawal of said leader block from said magnetic tape cartridge, said leader block further comprising:
means adapted to receive said latch member when said leader block is withdrawn into said magnetic tape cartridge.

41. The leader block of claim 40, wherein said receiving means comprises a groove on said back of said leader block adapted to engage a corresponding mating feature on said latch member.

42. The leader block of claim 40 wherein said receiving means comprises a notch extending substantially across said back of said leader block from said top to said bottom of said leader block and of a geometry to receive a mating projection on said latch member.

43. A substantially rectangular leader block for a magnetic tape having a first end, wherein said leader block has a top, a bottom, a front, a back, first and second sides, said leader block comprising:
means, located substantially along a centerline of said second side, adapted to receive a tape threading mechanism leader block threading pin; and
an aperture, located substantially along a centerline of said first side, for receiving said first end of said magnetic tape to enable said tape threading mechanism leader block threading pin to pull said leader block in a straight line with said magnetic tape.

44. The leader block of claim 43, wherein said magnetic tape in enclosed within a magnetic tape cartridge having a leader block latch mechanism including a latch member to prevent the withdrawal of said leader block from said magnetic tape cartridge, said leader block further comprising:
means adapted to engage said latch member when said leader block is withdrawn into said magnetic tape cartridge.

45. The leader block of claim 44, wherein said engaging means comprises a groove on said back of said leader block adapted to engage a corresponding mating feature on said latch member.

46. The leader block of claim 44 wherein said receiving means comprises a notch extending substantially across said back of said leader block from said top to said bottom of said leader block and of a geometry to receive a mating projection on said latch member.

47. The leader block of claim 43 further comprising first and second docking pin means located on said top and bottom, respectively, of said leader block, proximate said first side and adapted to guide said leader block into an opening in a magnetic tape cartridge that houses said magnetic tape.

48. The leader block of claim 43 wherein said receiving means comprises a substantially cylindrical notch extending a predetermined distance from said top of said leader block along said second side of said leader block toward said bottom of said leader block.

* * * * *